(12) United States Patent
Oliverio et al.

(10) Patent No.: US 11,106,565 B2
(45) Date of Patent: Aug. 31, 2021

(54) SYSTEM FOR TIME-DETERMINISTIC, DISTRIBUTED AND SYNCHRONIZED EXECUTION FOR CONTROL TEST AND MEASUREMENT APPLICATIONS

(71) Applicant: Keysight Technologies, Inc., Santa Rosa, CA (US)

(72) Inventors: Nestor Hugo Oliverio, Barcelona (ES); Marc Almendros Parra, Cubelles (ES)

(73) Assignee: Keysight Technologies, Inc., Santa Rosa, CA (US)

( * ) Notice: Subject to any disclaimer, the term of this patent is extended or adjusted under 35 U.S.C. 154(b) by 99 days.

(21) Appl. No.: 16/286,691

(22) Filed: Feb. 27, 2019

(65) Prior Publication Data

US 2019/0266027 A1    Aug. 29, 2019

Related U.S. Application Data

(63) Continuation-in-part of application No. 15/198,147, filed on Jun. 30, 2016, now abandoned.

(30) Foreign Application Priority Data

Aug. 3, 2015    (ES) .................................. 201531155

(51) Int. Cl.
*G06F 11/36* (2006.01)
*G06F 1/04* (2006.01)
(Continued)

(52) U.S. Cl.
CPC ............ *G06F 11/3664* (2013.01); *G06F 1/04* (2013.01); *G06F 9/30087* (2013.01); *G06F 9/52* (2013.01); *G06F 13/20* (2013.01)

(58) Field of Classification Search
CPC ............. G06F 11/1683; G06F 11/1645; G06F 11/165; G06F 11/1658; G06F 11/1687; G06F 9/30; G06F 9/3889
See application file for complete search history.

(56) References Cited

U.S. PATENT DOCUMENTS

| | | | |
|---|---|---|---|
| 5,361,369 A * | 11/1994 | Kametani | G06F 8/458 718/102 |
| 5,481,747 A * | 1/1996 | Kametani | G06F 8/458 718/102 |

(Continued)

OTHER PUBLICATIONS

Schoeberl, "Is Time Predictability Quantifiable?", 2012 International Conference on Embedded Computer Systems (SAMOS), Jul. 16, 2012, p. 333-338.

(Continued)

*Primary Examiner* — Nadeem Iqbal

(57) ABSTRACT

Systems for time-deterministic, distributed and synchronized execution for control, test and measurement applications, consisting of one or more modules (M0, . . . , Mn) that share at least one trigger signal and one clock signal and comprising a Time-Deterministic Processor, which uses the clock signal and one or more of the trigger signals shared by all modules (M0, . . . , Mn) to run a program distributed across multiple modules (M0, . . . , Mn) with precise control of instant of execution of each instruction and synchronize the execution of all or a subset of modules (M0, . . . , Mn). The Time-Deterministic Processor communicates with a common signal bus to all modules (M0, . . . , Mn), comprising a control bus which share at least a clock and trigger signals. Optionally, the signal bus includes a communication bus with which the time-deterministic processor in the modules (M0, . . . , Mn) communicates with each other and optionally with a host processor or external computer.

19 Claims, 10 Drawing Sheets

(51) Int. Cl.
*G06F 9/30* (2018.01)
*G06F 9/52* (2006.01)
*G06F 13/20* (2006.01)

(56) References Cited

U.S. PATENT DOCUMENTS

| | | | |
|---|---|---|---|
| 5,524,244 A | 6/1996 | Robinson et al. | |
| 5,634,004 A * | 5/1997 | Gopinath | G06F 15/17375 710/317 |
| 6,111,888 A * | 8/2000 | Green | H04J 3/0652 370/447 |
| 6,151,689 A * | 11/2000 | Garcia | G06F 11/1482 714/18 |
| 6,654,818 B1 * | 11/2003 | Thurber | G06F 13/28 710/23 |
| 6,751,566 B2 | 6/2004 | Sugai | |
| 8,601,486 B2 * | 12/2013 | Achterberg | G06F 9/52 718/107 |
| 9,137,038 B1 * | 9/2015 | Mazuk | G06F 13/40 |
| 9,158,565 B2 * | 10/2015 | Jakoljevic | G06F 9/45533 |
| 9,348,587 B2 | 5/2016 | Vorbach | |
| 9,443,269 B2 * | 9/2016 | Battyani | G06Q 40/04 |
| 9,577,609 B2 * | 2/2017 | Jaisimha | H03J 1/0091 |
| 9,785,587 B2 * | 10/2017 | Jan | G06F 9/4887 |
| 2017/0039125 A1 * | 2/2017 | Oliverio | G06F 11/3664 |

OTHER PUBLICATIONS

Schutz, "On the Testability of Distributed Real-Time Systems", Proceedings of the Symposium on Reliable Distributed Systems, PISA, Sep. 30-Oct. 2, 1991.
Search Report dated Nov. 18, 2015 in Spanish Patent Application No. 201531155.
Decision to Grant dated Jun. 27, 2016 n. Spanish Patent Application No. 201531155.
Non-final Office Action dated Nov. 16, 2017 for U.S. Appl. No. 15/198,147, 17 pgs.
Final Office Action dated Aug. 28, 2018 for U.S. Appl. No. 15/198,147, 23 pgs.

* cited by examiner

SYSTEM FOR TIME-DETERMINISTIC, DISTRIBUTED AND SYNCHRONIZED EXECUTION FOR CONTROL TEST AND MEASUREMENT APPLICATIONS

CROSS REFERENCE TO RELATED APPLICATIONS

The present application is continuation-in-part (CIP) applications under 37 C.F.R. § 1.53(b) of U.S. patent application Ser. No. 15/198,147 (hereafter the "parent application") filed on Jun. 30, 2016, the disclosure of which is hereby incorporated by reference herein in its entirety. Priority under 35 U.S.C. § 120 is also claimed from U.S. patent application Ser. No. 15/198,147.

The parent application claims priority under 35 U.S.C. § 119(e) from Spanish Patent Application No. 201531155 filed on Aug. 3, 2015 naming Nestor Hugo Oliverio, et al. as inventors. The entire disclosure of Spanish Patent Application No. 201531155 is specifically incorporated herein by reference.

BACKGROUND

The requirements of control, test and measurement systems have grown enormously in complexity in recent years, requiring increasing number of inputs/outputs, and increasing capacity and speed of processing and synchronization.

In control, test and measurement systems running multiple actions simultaneously and with fully precise timing is very important.

Synchronously and real-time management of actions and multiple input/output in control, test or measure systems is a challenge with many unsolved aspects or issues.

And these unsolved aspects or issues grow significantly in complexity with the increasing number of channels and speed of the systems.

To address this problem, current test and measurement systems use different architectures, as explained below.

Some systems are implemented with a centralized master controller that monitors and controls all actions.

This controller performs calculations and trigger measurement and control actions over the peripherals inputs and outputs, sensors and actuators.

The main controller can be, among other examples, a computer, a microcontroller or field programmable gate array (FPGA), according to the requirements of robustness, real-time and speed. Being a centralized controller, all tasks must be performed and synchronized from a single device, which significantly limits the speed and capabilities of the system. This limitation increases significantly with the number of inputs and outputs of the system and the complexity of the tasks to be performed. All this results in limitations on the performance and time precision. Scalability as required is also very restricted, so generally centralized processing systems require custom designed for each application.

The current trend is therefore the use modular architectures in control, test and measurement systems. Thus, maximum flexibility is achieved in terms of scalability, possibility of using standard products from different vendors (COTs), ease of repair and upgrade, etc. Some of these systems, the most modern, also incorporate the latest technologies in digital processing, such as FPGA and embedded processors that allow for a large processing capacity in each module. The major drawback of these systems is the ability to precisely synchronize all actions of the different modules and calculations performed in a distributed manner to implement the complete test, measurement and control solution.

In general to solve this synchronization problem a network of trigger signals between the different modules is used, which depending on the capabilities of each module, intend to trigger sequentially, synchronously and accurately the various measurement, test and control actions In many cases the propagation time of these trigger signals imposes major challenge that limits the system accuracy and also the complexity grows significantly with the number of modules involved.

The implementation of these systems just based on triggering is usually very complex and requires a lot of development work and turn-on.

Furthermore, as the number of trigger signals is limited, possibilities and flexibility are too.

On some platforms, such as PXI Express, the system provides a special slot to include a special module for centralized generation of the trigger signals that is able to trigger actions in other modules.

This approach solves some of the problems with the trigger propagation and improve accuracy, but still has major limitations when synchronizing multiple modules with cross triggering requirements.

In addition, the centralized approach does not allow, or offers very poor capabilities, to integrate distributed measurements and calculations implemented across modules into the triggering of actions The objective technical problem that arises is therefore to provide means for multi-module synchronized, in real-time and time-deterministic processing of the plurality of inputs/outputs of any control, test and measurement system.

SUMMARY

The present teachings serve to solve the above problem, solving the limitations of the solutions discussed in the prior art by providing a system for distributed time-deterministic execution for control, test and measurement applications, which allows to run hardware sequences and programs with full timing accuracy and synchronization between all modules in a system.

The present teachings belong to the field of electronics and, in particular to the industrial area of programmable systems to perform control, test and/or measurement functions.

More precisely, the present teachings refer to a system for time-deterministic (ie, precisely controlling the time of each action, in a totally repeatable manner without any randomness), distributed and synchronized execution of control test or measure applications, allowing multiple control, test and measurement instruments to perform a task by running each of them part of the actions with full time synchronization.

The present teachings are based on a time-deterministic processor (TDP), which can be part of the hardware of any control test and measurement piece of equipment. According to various representative embodiments, the TDP can be implemented into a microprocessor, an FPGA or an application specific integrated circuit (ASIC) device, FPGA or ASIC are the most convenient platforms for providing highest performance. The Time-Deterministic Processor (TDP) allows executing instructions by hardware indicating with absolute precision the execution time of each instruction in all modules of the control, test and measurement system, regardless of their function, for example, modules for signal generation, acquisition, communication, digital input/output, etc., all can incorporate adaptations of the same time-deterministic processor, TDP. This TDP enables distributed processing and execution of synchronized global actions. These distributed synchronized global actions include for instance but are not limited to synchronized conditional jumps in all modules of the system according to the calculations, measurements or information from any of the modules.

The propagation of the decisions or information across modules and the execution of the global actions with full synchronization in all modules is performed seamlessly, automatically, and transparently to the user.

One aspect of the present teachings relate to a system for distributed execution comprising a set of two or more modules to execute control, test and measurement applications, sharing at least one trigger signal and a clock signal, wherein all modules of the system include a time-deterministic processor (TDP) which use a common clock signal and at least one of the trigger signals shared by the modules to synchronize the execution of at least part of the set of modules or the full set.

In accordance with various representative embodiments, the invention can be used with a single module, in which case the synchronization capabilities would not be used, but all other features and advantages of time-deterministic execution would be exploited.

In the proposed distributed execution system the execution and synchronization timing accuracy between modules only depends exclusively on the skew and fluctuations (i.e., jitter) of the common clock signal to all modules and in particular the time-deterministic processor comprises calibration capabilities to cancel the clock skew between modules.

Some of the technical advantages of the various embodiments against the solutions of prior art are:

The present teachings allow the user to program the hardware of different modules using an intuitive graphical environment, textual code, or script files (sometimes referred to as "scripting").

Global synchronized actions, such as synchronized global jumps are programmed extremely easily as if all the modules were a single device and the execution centralized.

It is possible to control at any time with full time precision the actions executed by any of the modules.

The programming of the modules can be done by a programming software that incorporates features for time checking and synchronization validation on-the-fly while programming, which allow to work with multiple modules simultaneously and in a very simple way.

The teachings have all the advantages of modular architectures and provides a fully scalable mechanism for distributed and synchronized execution that provides absolute timing accuracy and is very simple to use and turn-on regardless of the number of modules in the system.

The teachings achieve a processing speed and unique synchronization, requiring only a single clock signal and a single multi-point trigger signal, both common to all modules, regardless of the number of modules in the system. In some cases, discussed below, two triggers are needed.

This significantly simplifies the requirements of interconnections between the modules with respect to current systems which generally require many triggers, and even specific modules whose only function is to generate the triggers to synchronize the other modules.

In accordance with a representative embodiment, the synchronization skew between modules depends only on the skew of the clock signal common to all modules, which is usually very low, and independent of the skew of trigger signals, which is usually much larger than the clock skew and is very difficult to reduce in the case of multi-point triggers. Clocks signals can easily be distributed in start configuration, which are able to minimize skew, without penalties to the application, however a multi-point trigger with multi-master capabilities cannot be distributed using a star configuration, a daisy chain topology is generally used which incur in significant skew from module to module due to the signal propagation delay through the chain.

The present teachings also contemplate the possibility of using time-deterministic multithreading in a module that, by the technique of interlacing in time instruction by instruction, ensure full time accuracy, which in conventional processors is impossible.

The system also provides tools to debug the software that significantly simplify the implementation of multi-module control, test and measurement systems. For example, it has the possibility of introducing breakpoints that stop global execution in a precise moment of time in all modules synchronously.

In accordance with the present teachings, modules with TDP can coexist with modules that do not include the technology described herein, because the TDP includes special instructions for generating and waiting for trigger or external signals in accordance with certain embodiments, in such a way that can interact with these other modules, like with external events.

BRIEF DESCRIPTION OF THE DRAWINGS

It then goes on to describe very briefly a series of drawings that help to better understand the present teachings, and which are expressly related to certain representative embodiments presented as a non-limiting example thereof.

DETAILED DESCRIPTION

Figure 1:
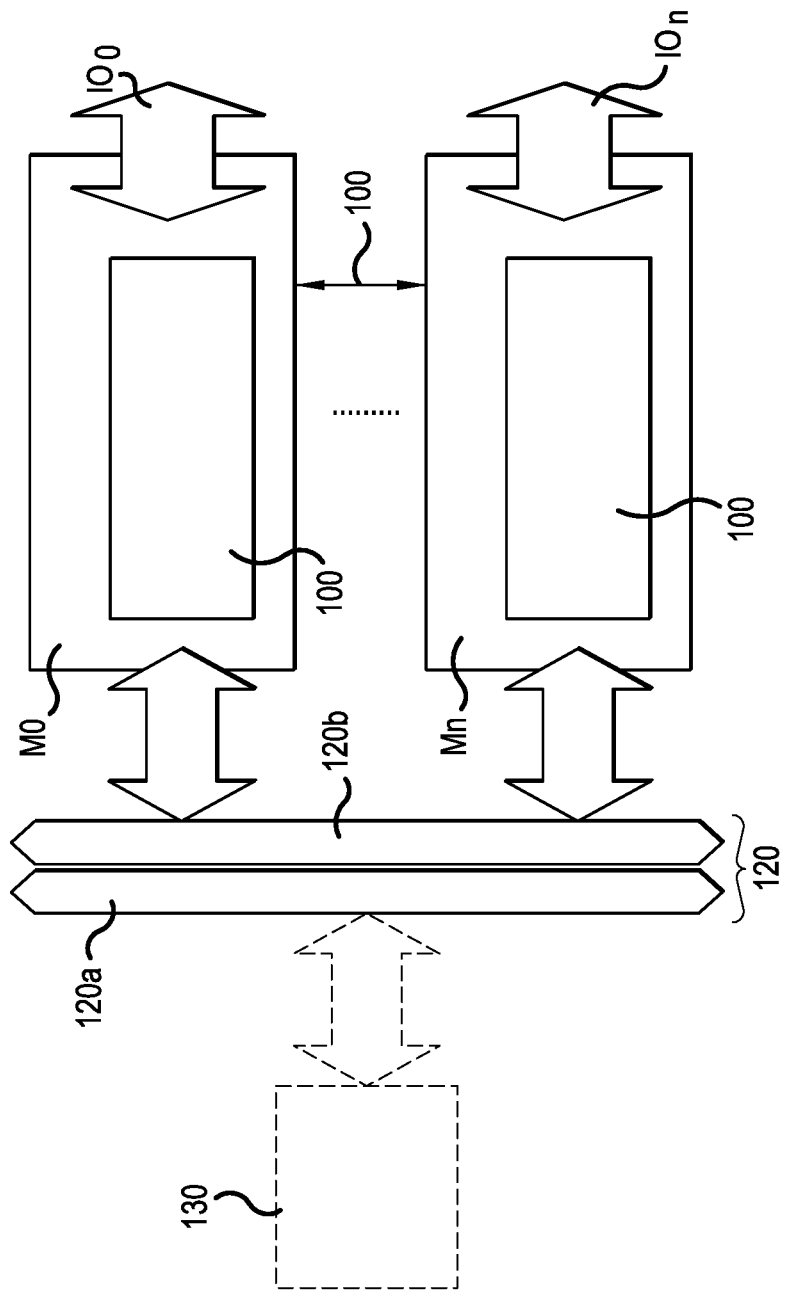
FIG. 1 shows a block diagram of the architecture of a distributed processing system for control, test and measurement applications, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only, and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

FIG. 1 shows a schematic diagram of the block architecture of the modular distributed execution system for control, test and measurement applications. The system comprises multiple hardware modules (M0, . . . , Mn) which, in turn, comprises a plurality of inputs/outputs ports ($IO_0$, . . . , $IO_n$). Each module (M0, . . . , Mn), which consists of a hardware assembly, that includes a programmable device such as a microcontroller and/or FPGA and/or ASIC, with their corresponding firmware and also a dedicated software that provides access to the module capabilities, often called the instrument driver, is intended to perform control, test and measurement functions. Each module (M0, . . . , Mn) is connected through a common signals bus (120) to all modules (M0, . . . , Mn), comprising a control bus (120a) through which all modules (M0, . . . , Mn) share one or more clock signals and one or more trigger signals. Furthermore the signal bus (120) may include one or more communication buses (120b) through which each module (M0, . . . , Mn) communicates with the rest and, optionally, with an external processor (130), which can be a computer system. The computer system may include a main memory and a static memory, where memories may can communicate with each other via the signal bus 120. Memories described herein are tangible storage mediums that can store data and executable instructions and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer.

Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. "Memory" is an example of a computer-readable storage medium. Computer memory is any memory which is directly accessible to a processor. Examples of computer memory include, but are not limited to RAM memory, registers, and register files. References to "computer memory" or "memory" should be interpreted as possibly being multiple memories. The memory may for instance be multiple memories within the same computer system. The memory may also be multiple memories distributed amongst multiple computer systems or computing devices.

Alternatively, the external processor 130 may be an embedded controller. The embedded controller may include a controller with a combination of a memory that stores instructions and a processor that executes the instructions in order to implement processes described herein. The term "controller" broadly encompasses all structural configurations, as understood in the art of the present disclosure and as exemplary described in the present disclosure, of an application specific main board or an application specific integrated circuit for controlling an application of various inventive principles of the present disclosure as subsequently described in the present disclosure. The structural configuration of the controller may include, but is not limited to, processor(s), computer-usable/computer readable storage medium(s), an operating system, application module(s), peripheral device controller(s), slot(s) and port(s). A controller may be housed within or linked to a workstation. Examples of a "workstation" include, but are not limited to, an assembly of one or more computing devices, a display/monitor, and one or more input devices (e.g., a keyboard, joysticks and mouse) in the form of a standalone computing system, a client computer of a server system, a desktop or a tablet. Additionally, the descriptive labels for the term "controller" herein facilitate a distinction between controllers as described and claimed herein without specifying or implying any additional limitation to the term "controller".

In addition, each module (M0, . . . , Mn) can have one or more programming and debugging ports (110). Each and every one of the modules (M0, . . . , Mn) has in the core a Time-Deterministic Processor, TDP, (100).

Figure 2:
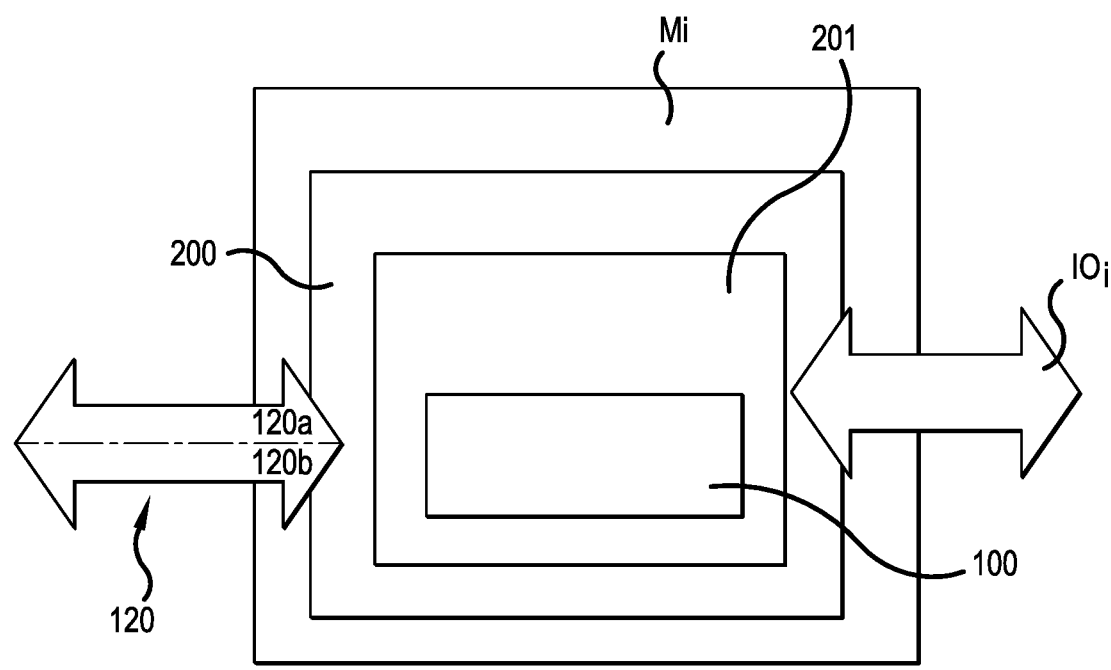
FIG. 2 shows a block diagram of the architecture of a module of the distributed processing system that includes the Time-Deterministic processor, according to a representative embodiment.

FIG. 2 shows a block diagram of the architecture of a module (Mi, i=0, . . . , n) comprising the Time-Deterministic Processor (100). The module (Mi) consist of a hardware assembly (200) which is in general implemented with a printed circuit board (PCB), that include all the necessary circuitry for the instrument operation and communication with other modules, devices under test (DUT), the computer, etc. The hardware assembly (200) includes, but is not limited to power supplies, RAM and FLASH memories, clocking circuit, input/output dedicated circuit that can consist of Digital to Analog Converters (DACs), Analog to Digital Converters (ADCs), Digital input/output drivers, amplifiers, filters, etc. The hardware assembly (200) further consists of a processing device (201) which controls most or all functionalities of the instrument (Mi), it can be implemented, but not limited to a microprocessor, FPGA, or ASIC. Microprocessors are programmed using standard computer programming languages, such as C, C++, assembly, etc, while FPGAs and ASICs are programmed using Hardware Description Languages, such as VHDL or Verilog. FPGAs and ASICs offer great advantage in terms of performance and parallelism over microcontrollers which is extremely important for high performance control, test and measurement equipment. The processing device (201) is connected to input/output ports (IOi) which consist of very diverse type of signals, determined by the specific type of instrument (Mi), in general the input/output ports are connected to other instruments or the device under test (DUT) and can include, but it is not limited to analog, digital, optical and radio frequency signals. The processing device (201) is also connected to the signal bus (120), where the signal bus (120) includes at least one clock signal and at least one trigger signal common to all modules (M0, . . . , Mn) in the solution, at least one trigger signal is required to perform the synchronization between modules. In some implementations the signals that compose the signal Bus (120) are part of a standard that enforces specific implementations of these signals in order to achieve inter-module operation and communication, examples of such standards that will be discuss in further details later are, PXI (Peripheral Component Interconnect—PCI—eXtensions for Instrumentation), or AdvancedTCA Extensions for instrumentation (AXIe).

The time-deterministic processor, TDP, (100) is implemented inside the processing device (201) and is connected to the signal bus (120) and the Input/Output ports (IOi). In a preferred implementation where the processing device is an FPGA or ASIC the time-deterministic processor (100) can be implemented using the VHDL and/or Verilog languages. FPGAs has the advantage over ASICs that allow the upgrade of the time-deterministic processor easily on-system.

Figure 3A:
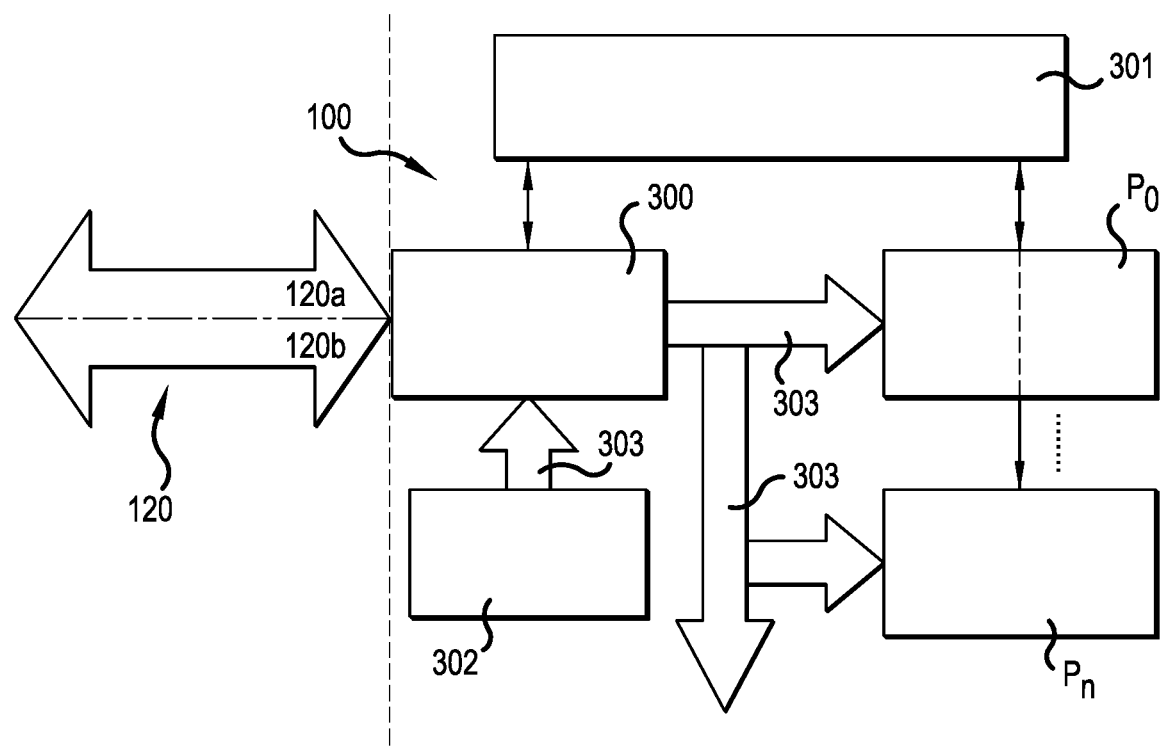
FIG. 3A shows a block diagram of the architecture of the Time-Deterministic Processor in a module, according to a representative embodiment.

FIG. 3A shows a block diagram of the architecture of the Time-Deterministic Processor (100) with the associated components and subcomponents as implemented inside the processing device (201) in accordance with a representative embodiment. The TDP (100) is implemented with a TDP core (300) common to all modules, ensuring the proper operation of synchronization across different types of control, test and measurement instruments. The TDP core (300) interoperates with TDPs in other modules through the signal bus (120) connected to all modules. The TDP sub-system also includes a program memory (302) or some other sort of source of instructions for the TDP core to execute, and depending on the module implementation one or more specific instruction engines (P0, . . . , Pn) for the execution of additional functions including the various specific functions that characterize each type of test and measurement module.

The instruction engines (P0, . . . , Pn), run one or more types of instructions and there may be one or more instruction engines (P0, . . . , Pn) in a module. The instruction engines (P0, . . . , Pn) has the instrument specific knowledge and consist of a parser that is capable of processing the instructions received from the TDP core (300), which have a specific format as exemplified in FIG. 4 and explained below, and converting them into specific actions and configurations to apply to the instrument in particular, but not limited to control the instruments operation and input/outputs ports (IOi). In a preferred implementation in an FPGA, the instruction engines (P0, . . . , Pn) are implemented using a Hardware Description Language (HDL). Notably, the number and type of instructions that the instruction engines (P0, . . . , Pn) execute depends on each specific instrument, as an example, an arbitrary signal generator my include product-specific instructions to change the output amplitude of each I/O port and to select the next waveform in memory to generate. In the first case the output amplitude instruction may include the value of the amplitude and a number for the I/O port to apply the amplitude change, these two parameters are encoded in the instruction word (303) that are translated by the instruction engine into the specific control signals inside and/or outside the processing device (201) to change the amplitude to the selected I/O port. For the case of the instruction to select the next waveform to play from memory, it may include parameters like the index of the waveform in memory to send to the I/O port, the I/O port to use and other configurations for the operation like repetition cycles, clock divisor, start delay, etc, all these parameters are encoded into the instruction word (303) and then processed by the instruction engine to generate the necessary control signals for the blocks inside and/or outside the processing device (201) to fetch the waveform from the module memory and send it to the right I/O port with the selected configuration. This architecture with instruction engines (P0, . . . , Pn) enables ease integration of the TDP into different instruments and extensions to incorporate new instructions to meet different requirements.

The TDP sub-system may optionally also include some additional Data, Memory and HW peripherals connected to the TDP core (300) and the Instructions Engines (P0, . . . , Pn).

The Time-Determinist Processor core (300) inside the processing device (201) builds up the time-deterministic processor (100), in a preferred implementation in an FPGA the TDP core (300) is implemented in a Hardware Description Language (HDL). The TDP core (300) reads from the program memory (302), or other source, the instruction words (303) that build the program and execute them. The TDP core (300) processes each instruction word (303) at the exact time as indicated in the instruction word itself. The TDP core 300 executes internally the core instructions, while the module-specific instructions are sent out to be processed by the instruction engines (P0, . . . , Pn), which interpret and execute further product-specific instructions included in the instruction word (303).

Figure 3B:
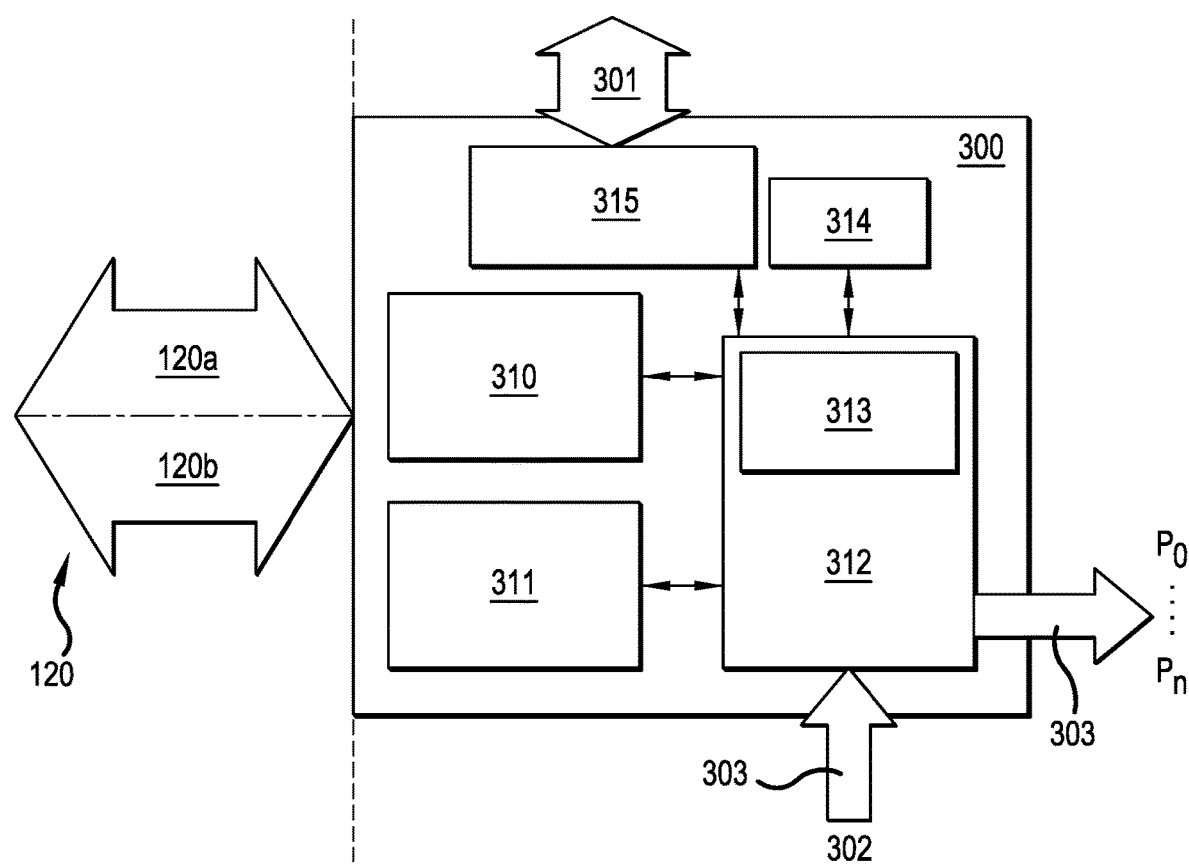
FIG. 3B shows a block diagram of the internal architecture of the Time-Deterministic Processor Core, according to a representative embodiment.

FIG. 3B, shows a block diagram of the internal architecture of the TDP core (300), which includes, but it is not limited to, a Clock/Trigger manager (310) which is connected to the control bus (120a), a Communication manager (311) which is connected to the communication bus (120b), internal memory (314), an optional external Data/Memory/Peripheral manager (315), and the time-deterministic processing unit (312). The time-deterministic processing unit integrates time counters (313).

Illustratively, time counters (313) consist of several associated counters that are used as the time reference for all time-deterministic operations. The multi-module synchronized time-deterministic execution is not only or always based on triggers, but rather may rely significantly on the internal time counters of each TDP, and on the fact that all these counters can be aligned in all modules (M0, . . . , Mn). The execution time of each instruction block is determined by one of these timers, the instruction timer, that is the time-deterministic processing unit processes each instruction at the exact clock cycle when the time indicated in the instruction word (303) matches the instruction timer included in the time counters (313). The time counters (313) also include synchronization counters that are used together with the triggers to resynchronize the modules (M0, . . . , Mn) when needed.

The TDP has a specific procedure to reset and synchronize the time counters (313) of the TDPs in all modules (M0, . . . , Mn). This initialization or calibration procedure is performed once at the startup of the system but can also be retriggered at any time if the application configuration or needs change. This initial calibration is performed by the execution and debugging tool (520), relies on the clock signal and trigger signals in the control bus (120a). The time counters (313) can be flexibly programmed to any rate which enables to run time-deterministic multi-module applications even with modules running at different clocks, not multiple of each other, and even not multiple of the clock signal in the control bus (120a). The calibration of the time counters (313) also take into account the propagation delay of the triggers. In the case where the maximum trigger propagation delay is smaller than the period of clock signal in the control bus (120a), then only one trigger is needed to perform the calibration of the time counters together with the clock signal. In other cases where the trigger propagation circuitry includes buffering and the trigger propagation delay is larger than the clock period, then an additional trigger is needed to perform the time counters calibration, which basically allows to compensate for the additional propagation delay.

Figure 4:
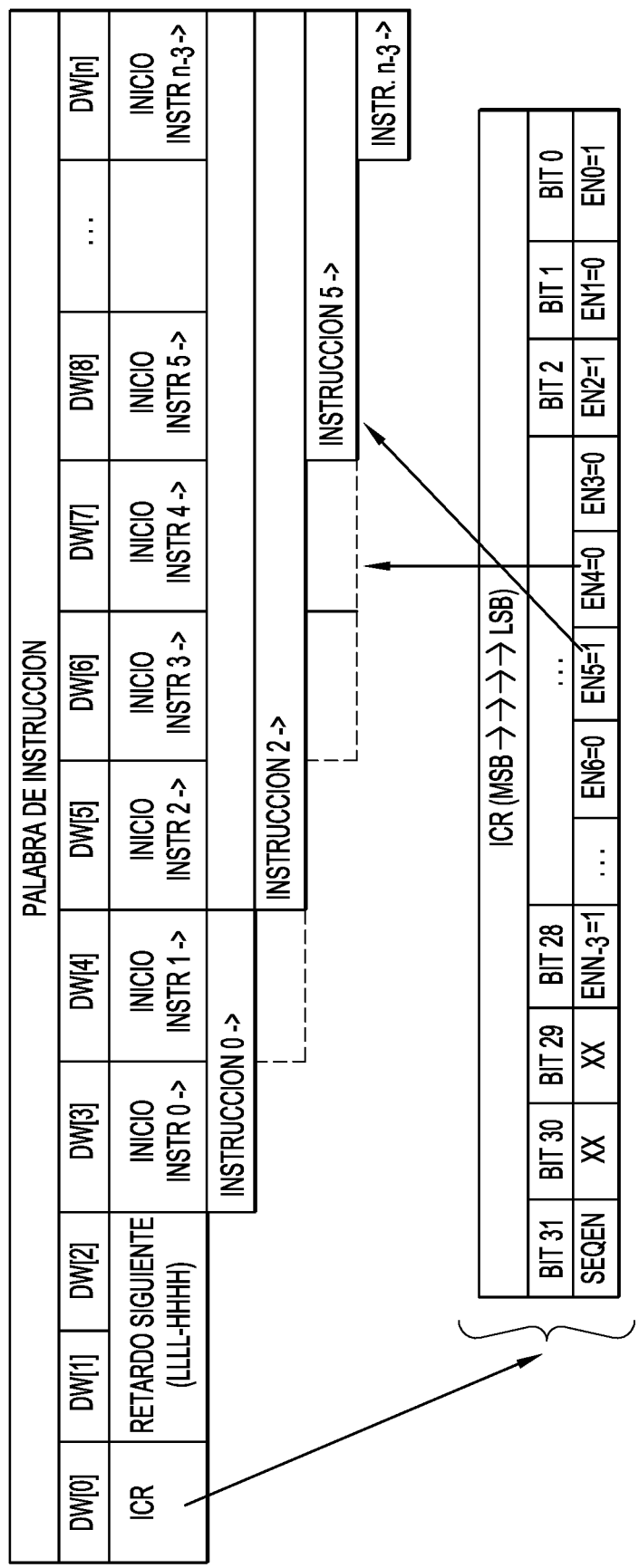
FIG. 4 shows a diagram of the structure of the instructions word executed by the Time-Deterministic Processor, according to a representative embodiment.

FIG. 4 shows the structure for an instruction word (303) that feeds the Time-Deterministic Processor (100). The instruction word (303) has a special structure to include, but not limited to, at least one field (DW [1], DW [2]) with the exact time of execution of each instruction word, which can be absolute time, or relative to the previous instruction. It also contains a Instruction Control Register (ICR-DW[0]) that allows enabling the execution of one or more instructions that can be placed flexibly in the instruction word (303). The instruction word (303) has a variable length depending on the needs of each module, a larger instruction word (303) allows to execute more instructions in the same instant of time in each module which is a very important aspect for control, test and measurement applications. In the specific example of FIG. 4. the instruction word (303) includes 4 instructions to be executed at the same time, Instruction 0, 2, 5 and n–3, and the corresponding control fields in the ICR (DW[0]) En0, En1, En5 and En n–3 are set to one, to enable the execution of these instructions by the TDP core (300) and the instruction engines (P0, . . . Pn). Each of these individual instructions encode actions and parameters to be processed and executed by the TDP core (300) and the instruction engines (P0, . . . Pn), the binary format of how this information is encoded depends on each instruction, however some fields like an instruction ID is expected to be placed in the same position for all instructions in order to guaranty each instruction engine and the TDP can recognize the instructions properly. The ICR may further include additional control fields in the ICR to signal specific operations for the TDP core (300), the SEQEN field in the ICR in FIG. 4. Is an example of a field that when set to 1 indicates that instruction 0 is a special flow control or synchronization instruction that must be processed by the TDP core (300) and not by the instruction engines (P0, . . . Pn).

The TDP (100) has special instructions for synchronization and conditional synchronized actions, which are implemented in the TDP core (300), which allow a decision or information generated by one to propagate across all modules (M0, . . . , Mn) in the system, and all modules to execute a conditional jump or any other action under this decision or information with complete time synchronization. This is a unique feature of the TDP (100), and to achieve this the TDP (100) requires only a single clock signal and at least one trigger signal, both signals shared to all modules (M0, . . . , Mn) in the signal bus (120). A trigger signal is a multi-point digital connection that connects all modules (M0, . . . , Mn) together to form what is known as a "wired OR" or a "wired AND" according to the standard of the logic drivers used. In large systems with many modules the trigger propagation circuitry may include buffers in the path to limit the electrical loading on each instrument trigger drivers. In this case depending on the specific implementation, the TDP may require additional triggers to execute some synchronized actions as described above. If the system has more than one of these trigger signals, such as the PXI Express platform has eight trigger signals, the TDP (100) can optionally make use of the additional trigger to increase the synchronization and decision/information exchange speed, and repetition rate of synchronized actions.

Furthermore the TDP (100) can use for the transfer of the decisions or information the communication buses (120b) available to the modules (M0 . . . Mn). For example, if the control, test and measurement platform used is PXI or PXI Express, the communication bus (120b) used by the time deterministic processor (100) is respectively a Peripheral Component Interconnect (PCI) bus, PCI Express bus.

For example, a representative embodiment is implemented on PXI or PXI Express platform which are widely used in control, test and measurement applications in most industries.

The PXI Express standard defines a chassis which has a backplane generally in the form of a printed circuit board with slots to plug in modular instruments, or just modules.

The backplane distributes across all modules the following signals: power supply, a PCI Express bus, a 100 MHz clock, CLK100, a 10 MHz clock, CLK10, a sync signal synchronous to the 100 MHz clock, SYNC100, which allows modules to replicate internally the CLK10 from the CLK100, and 8 multi-point trigger signals, PXI trigger Bus, among other signals. The PXI trigger bus performs a "wired" connection of the modules trigger lines and integrate pull-ups to keep the triggers lines at the high level when no module is driving the line. In large PXI Express chassis bidirectional buffers are added in the backplane at some points to limit the maximum loading of the trigger drivers in the modules.

The modules have an FPGA that communicates with a PC and with the specific hardware that makes up each specific type of control, test and measurement instrument. In this representative embodiment the Time-Deterministic Processor is implement using Hardware Description Languages, VHDL and Verilog, which are commonly used in FPGA and ASIC programming.

For the communication between the PC and FPGA, PCI Express standard protocol is used. By way of example, a switch/driver devices can be used or alternatively, the connection can be made directly to the FPGA. The FPGA controls the PCI Express communication and other hardware components.

The TDP (100) is implemented within an FPGA which is connected to the 100 MHz clock, CLK100, and SYNC100, which together represent the main clock reference for the TDP, and with the 8 PXI trigger lines, the TDP controls with full time precision the execution of each instruction to achieve fully synchronized execution across all modules. As described above, the internal time counters (313) in each TDP together with the initial calibration process, enable the TDPs in the different modules to run at an internal clock different from CLK100 and also different between the different modules.

With the TDP (100), the synchronization skew between modules depends only on the skew of the 100 MHz clock and SYNC100 signal in the different slots of the PXI Express chassis and is independent of the skew or propagation delay of the PXI Triggers.

The CLK100 and SYNC100 signals are distributed to all slots inside the chassis using a star topology which can achieve very low slot to slot skew. The clock skew depends only on the chassis used and it is guaranteed to be less than 250 ps, although most chassis have much lower skew than what the standard specifies and it can be significantly further improved if an initial one-time calibration is performed. The user can select which of the 8 triggers available on the PXI Express Trigger Bus wants to allow to be used by the TDP (100) and the TDP software manages the allocation of these resources.

For PXI, the standard the preceded PXI Express, there is no CLK100 or SYNC100 signals, instead in this platforms the embodiment is implemented using the 10 MHz clock, CLK10, and the eight multi-point trigger signals, and the PCI communication bus is used instead of the PCI Express.

Another representative embodiment is implemented on an LXI platform, Local Area Network, LAN, Extension for Instrumentation where the clock signal and control bus (120a) communicate between modules using the wired trigger bus provided in the LXI specification and where the communication bus (120b) consists of a Local Area Network (LAN).

Another representative embodiment is implemented on the Advanced Telecomunications Architecture (MicroTCA platform), or some of its variants, as microTCA.4, where the clock signal is communicated between modules using some of the various clock ports provided by the standard, CLK1, CLK2, CLK3, TCLKC or TCLKD, and trigger signals can communicate through ports 17 to 20. Where the communication bus (120b) can be selected between Ethernet, PCI Express and Rapid Serial Input Output (SRIO) depending on the implementation of the system.

Another representative embodiment is implemented on the platform AdvancedTCA Extensions for instrumentation (AXIe) where, similar to PXI Express, the backplane signals CLK100 and SYNC are used, and one or more of the 12 MLVDS available trigger signals and where the communication bus (120b) can be selected from a LAN connection or PCI Express.

The decision or information on which any global action or conditional synchronized jump is executed may depend on one or more modules (M0, . . . , Mn) in the system.

To force the synchronization of the modules (M0, . . . , Mn), that is, execute an unconditional synchronization point, the TDP (100) uses the same mechanism as in synchronized conditional jumps, and instead of sharing a decision the TDP can share any information that each module can use in following actions.

In addition, the TDP (100) has special synchronized execution instructions as the "Start" node that allows to start the execution in all modules (M0, . . . , Mn) simultaneously.

The synchronized actions, like synchronized jumps and synchronized junctions can involve all modules (M0, . . . , Mn) in the system or just a subset of them.

The TDP (100) also has flow control instructions as while, if, for, etc, both local to a single module and multi-module synchronized.

It also has math, logic operations, and access to data and variables of the module itself or the rest of the modules.

And it has all the necessary instructions to control the specific capabilities of the module (Mi), i=0, . . . , n, on which it is implemented.

The TDP (100) also has instructions to generate and wait for triggers to interact with modules not incorporating a TDP (100) and with external events.

There are two basic types of instructions that can be run by the TDP (100).

The Triggered Instructions which are initiated or triggered by the TDP (100) and do not consume time, or clock cycles, of the TDP (100), that is, the execution of these instructions starts and in the next clock cycle the TDP (100) can process a new instruction word and execute further instructions. These instructions may require several cycles to run but run in parallel regardless of operation of TDP (100).

The second instruction type are those that consume TDP (100) time, that is, need several clock cycles of the TDP (100) to be executed, in this case the TDP (100) cannot process the next instruction word to execute following instructions until the previous instruction is completed; Typical examples are the flow control instructions like wait, while, for, if, etc.

This second type of instructions are implemented in the TDP core (300) of the TDP (100), while triggered instructions, can be implemented in both the TDP core (300) and the instructions engines (P0, . . . , Pn). In the case of the triggered instructions, it is possible to start the execution of multiple instructions sequentially when the previous instruction is still ongoing, to achieve this behavior the instruction engines must be implemented using a pipeline architecture.

The TDP (100) can also implements time-deterministic threads, which allows to include in each module (Mi) more than one execution thread that run in parallel with a technique of interlacing in time instruction by instruction. This technique ensures a time-deterministic distribution of instruction execution in all threads, ensuring full time accuracy. The main thread runs natively synchronized with other modules and semaphores and events allow to synchronize the different threads of the same module to each other and to the main thread. Furthermore it is possible to choose whether to include any of the global synchronized instructions in one or more of the secondary threads.

Figure 5:
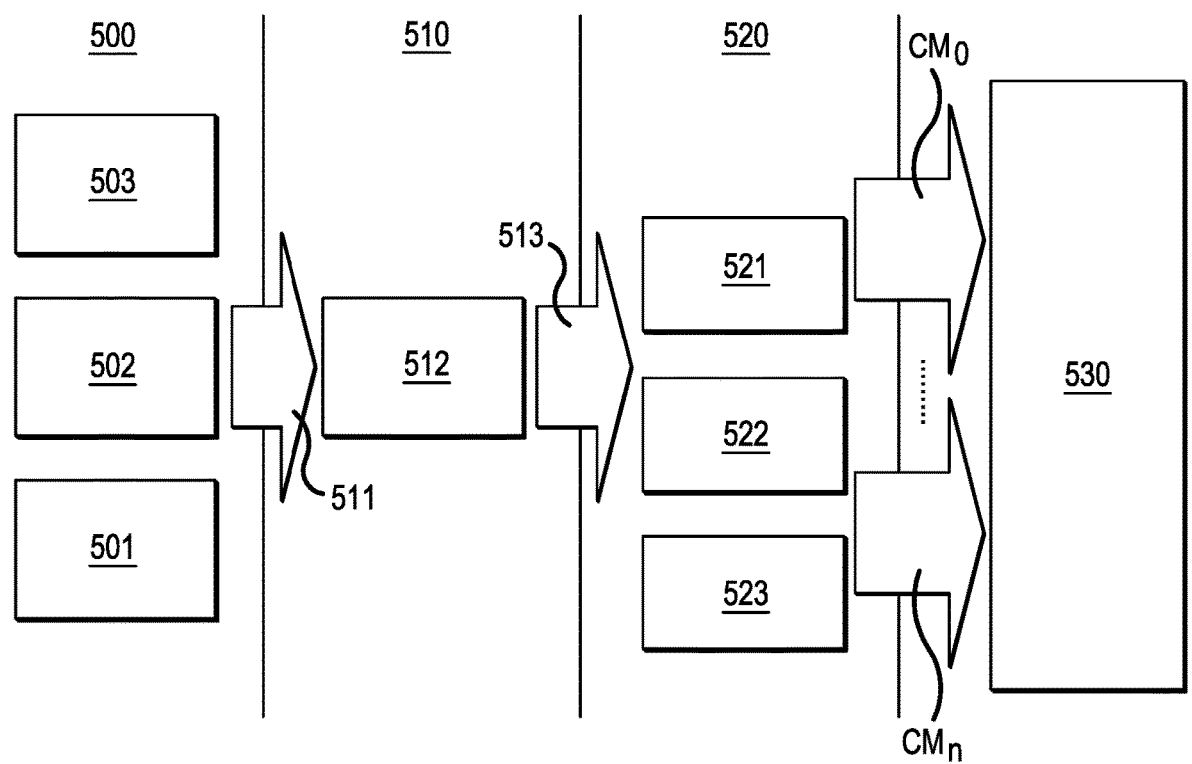
FIG. 5 shows a diagram of the programming, compilation and execution process using the Time-Deterministic Processor, according to a representative embodiment.

FIG. 5 shows schematically the process of execution, programming, and compilation of the TDP (100) instructions for each module (M0, . . . , Mn). The user programs the entire system or part of it, implementing a code for each of the modules (M0, . . . , Mn) involved in the control, test and measurement application.

The first phase in the process is the program or high-level source code (511) entry or creation by the user, to create the program the user can use an Application Programming Interface, API, (502) for standard computer programming languages, a scripting language that takes the form of a formatted text with the sequence of instructions for all modules by means of a scripting environment (501), or a graphical language by means of a graphical use interface (GUI) (503). The program or high-level source code (511) consists of instructions local to each module and synchronized instructions global to all, or a subset of the modules (M0, . . . , Mn), as described above. The TDP (100) guarantees that global instructions run fully synchronized in all or a subset of the modules as programmed by the user.

Not all modules (M0, . . . , Mn) in the system must work together, it is possible to have groups of modules that work together, which are programmed and operated completely synchronized independently of the modules outside the group. Each group is programmed with the ability to execute instructions fully synchronously in all of them as if they were a single hardware.

The high-level source code (511) written by the user using the GUI (503), the API (502) or the scripting environment (501), as discussed above, allow the user to easily add multi-module synchronized instructions and instruction specific to each local module with full control of the execution timing.

The scripting and programming environments (501), together with the TDP compiler (512) performs all checks for consistency of global and individual code. In the compilation phase (510), the TDP compiler (512) compiles the high-level source code (511) of the group of modules (M0, . . . , Mn) as a whole to obtain a TDP compiled code (513), from which an executable code (CM0, . . . CMN) for each specific module (M0 . . . Mn) is generated. In the compilation phase (510) high-level instructions are converted in the instructions the TDP (100) can execute, the TDP compiler (512) manages triggering and communication resources available to achieve synchronization and decisions or information sharing between modules (M0, . . . , Mn) automatically and transparently to the user.

The TDP compiler (512) verifies the correct syntax for all instructions and the availability of the resources needed at each instant for the execution. In summary, the source code (500) entered by the user is compiled to generate the specific executable code (CM0, . . . , CMN) for each module (M0 . . . Mn), during compilation the TDP compiler (512) generates the special code needed for each of the global synchronization instructions analyzing each code section between synchronized statements. The programming tool and compilation usually runs on a computer, but could run on any other platform, and also the programming and compilation tool could run on different platforms. The last phase of the process is when the executable code (CM0 . . . CMN) generated for each module is downloaded to each module in the group and then this code is executed synchronously by the TDP (100) in the hardware system (530) of each module. A Software tool handles downloading the executable code (CM0, . . . , CMN) to each module (M0, . . . , Mn), the control of the execution and debugging. This tool can consist of a graphical user interface (521), command line (522) and a programming library (523). The communication with the Hardware can be made through the same communication bus (120b) connecting all modules (M0, . . . , Mn) between themselves and with the PC or system controller if available, or through a specific programming port available in each module. The three phases described above are generally performed and repeated iteratively by the user during the program development, deployment, and testing process.

Figure 6A:
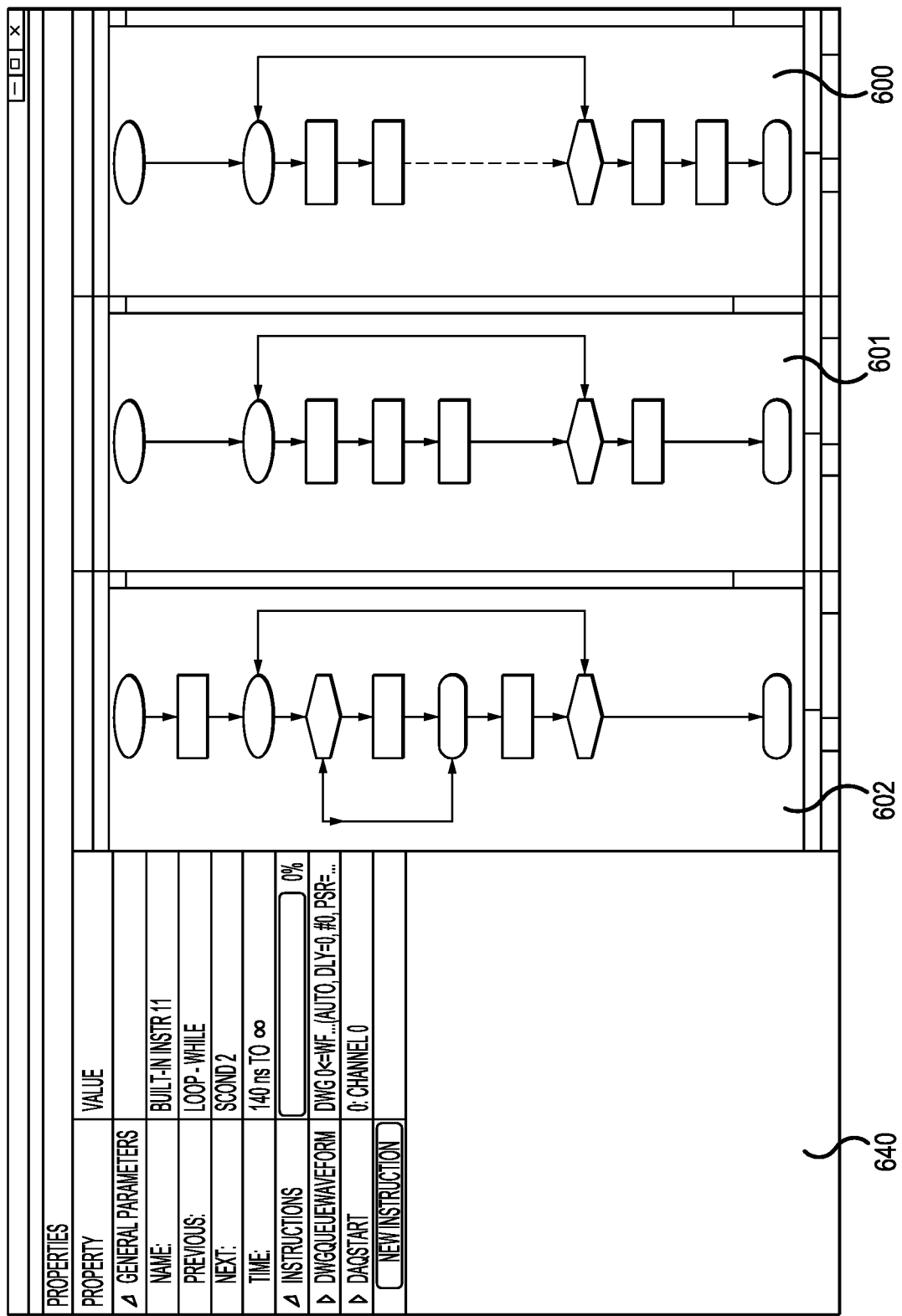
FIG. 6A shows a graphical user interface of the multi-module synchronized programming software tool of the system, with multiple flowchart windows for the various modules, according to a representative embodiment.
Figure 6B:
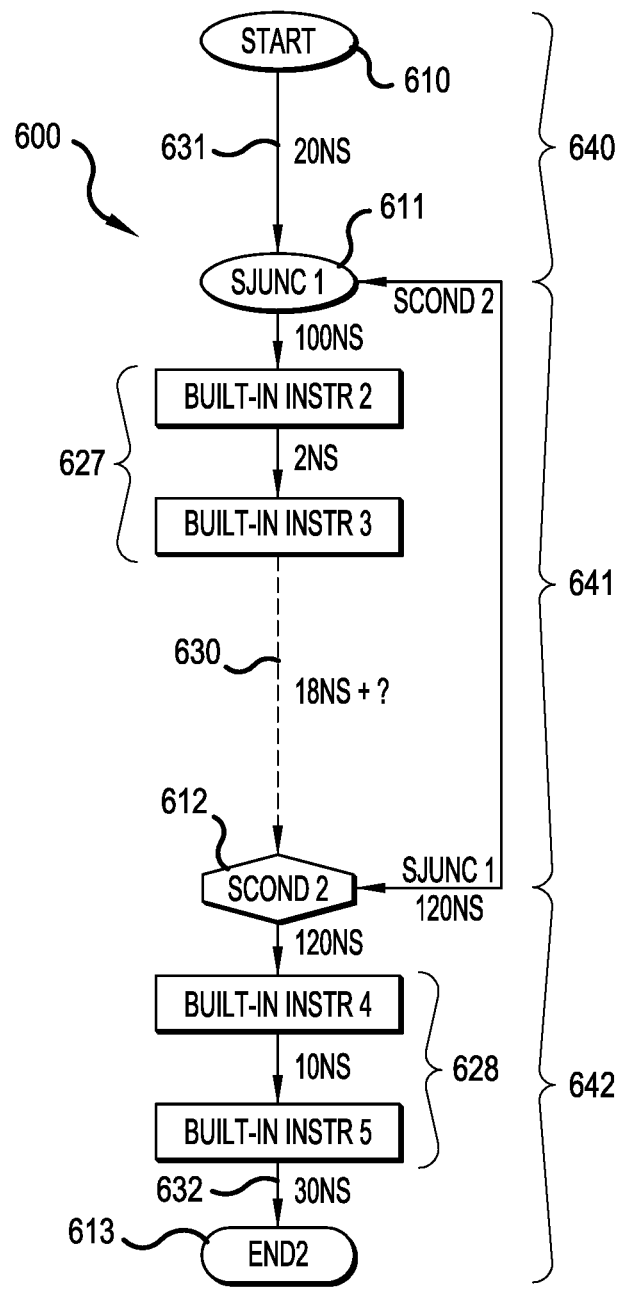
FIGS. 6B, 6C and 6D show a flowchart window respectively for each module, of the multi-module graphical programming tool of FIG. 6A, according to a representative embodiment.
Figure 6C:
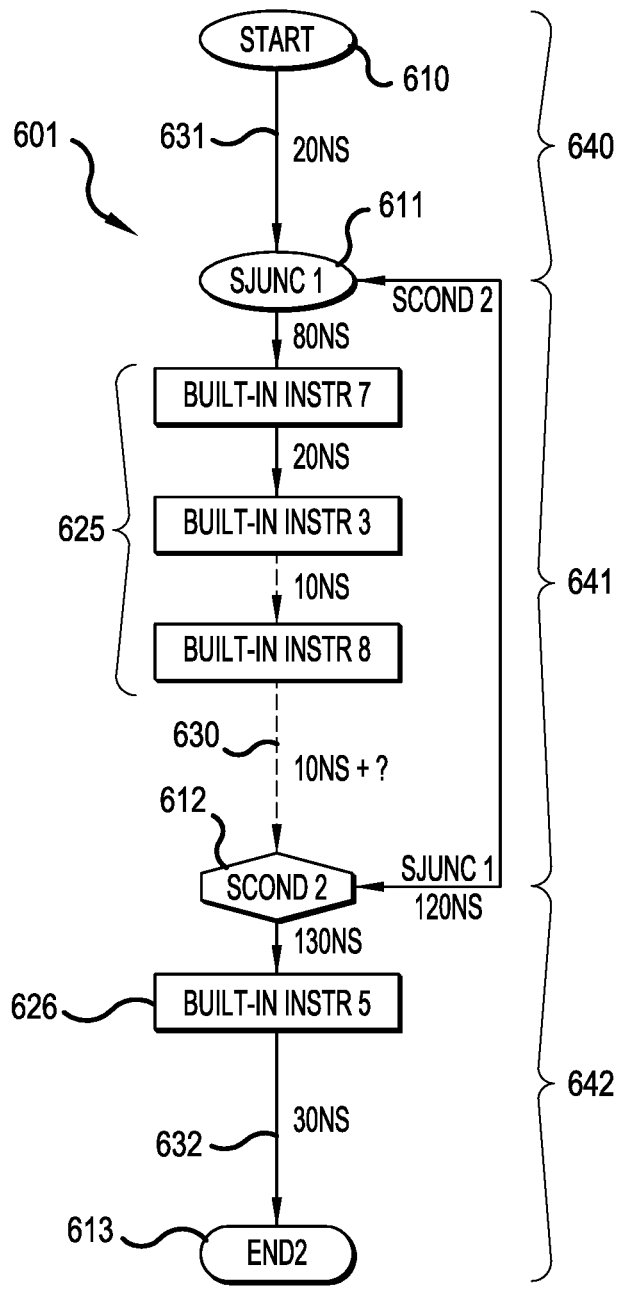
Figure 6D:
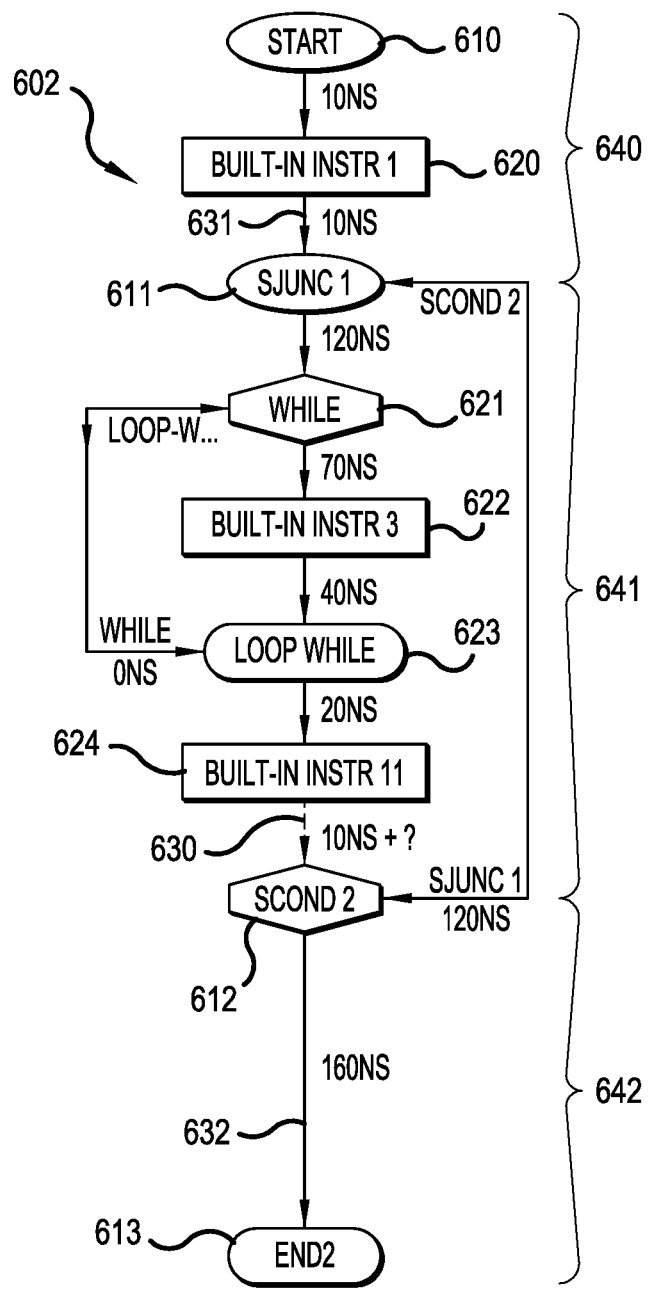

FIG. 6A shows an example of one implementation of a graphical user interface (503) for the programming of the hardware system (530), which allows ease programming of each module by means of one or more flowcharts, as shown in detail as an example in FIGS. 6B-6D.

The graphical user interface (503) allows a user to select by means of a dialog which group of modules are included in the project to work synchronously. Once the project is created a flowchart window per module becomes available, together with further flowchart windows for each thread, the tool also present additional instruction configuration windows, debugging windows, etc. As an example, FIG. 6A shows three flowcharts (602, 601, 600) corresponding to three modules added into the working project, along with a properties window (640) that shows the parameters that can be configured for the selected element in the flowcharts, these parameters include some general parameters common to all elements and special parameters specific to each element. The flowcharts (600, 601, 602) in FIG. 6A are shown in detail in FIG. 6B, 6C, 6D, flowchart 600 for a first module, is shown in detail in FIG. 6B; flowchart 601 for a second module, is shown in detail in FIG. 6C; and flowchart 602 for a third module, is shown in detail in FIG. 6D. The graphical user interface (503) allows the user to program all modules simultaneously and automatically manages the global synchronized items. In FIGS. 6B, 6C, and 6D the a global synchronized junction 610 (i.e., is a synchronization point and in particular to the start of the program) is placed automatically by the GUI (503) and enforces all modules to start the execution at exactly the same time. The next global synchronized element is 611, another synchronization point and as a consequence the GUI (503) shows 611 in all flowcharts aligned vertically. Between global synchronized junction 610 and global synchronized junction 611, flowcharts 600 and 601 (FIGS. 6B and 6C) has no local instructions while flowchart 602 (FIG. 6D) has one local instruction element that correspond to one instruction word (303) that can include one or more individual instructions to be executed locally in the corresponding module. The arrows that connect the different elements specify the exact time the TDP core (300) waits between instruction execution and the TDP compiler (512) use this information to complete the time field (DW[1] and DW[2]) in the instruction word (303). The next global element, 612, is a synchronized conditional jump that the GUI (503) shows vertically aligned in the three flowcharts. Between global synchronized elements 611 and 612, the different flowcharts and corresponding modules perform different local actions, flowchart 600 executes two local instruction words indicated as 627, flowcharts 601 executes three local instruction words indicated as 625, and flowcharts 602 executed a while local loop indicated by elements 621 and 623, with one local instruction block inside (622) and one local instruction block (624) after the while loop. The last global element is the global synchronized element (613). Between global synchronized elements 612 and 613, flowchart 600 executes two local instruction words indicated as 628, flowchart 601 executes one local instruction word (626) and flowchart 602 none.

The flowchart of each module is composed of instruction elements and timing arrows as shown in FIGS. 6A-6D. These timing arrows interconnecting a source element with a destination element in the flowchart indicates the exact time the TDP waits between the execution of the two elements. The arrows indicate the exact time specified in nanoseconds (ns) as shown in FIGS. 6B-6D, thus this units can be changed. Instruction elements may contain actions, calculations, flow control instructions, data transfer, etc. The instructions can be local to the module or global multi-module synchronized. The global synchronized junctions (610, 611, 612, 613) are inserted into one of the modules and are automatically replicated in all the other modules in the group. The software generates the necessary code to maintain full synchronization and propagate decisions and information transparently to the user to ensure the execution of the synchronized elements happen at exactly the same instant of time in all modules.

Local elements (620, 621, 622, 623, 624, 625, 626, 627, 628) of each module can maintain synchronism or not.

There are cases in which local elements (620, 621, 622, 623, 624, 625, 626, 627, 628) of all modules (M0, . . . , Mn) corresponding to local instruction words (303), when running do not maintain synchronism with the other modules because during execution they consume an amount of time, or TDP (100) clock cycles, unknown by the TDP compiler (512) during compile time prior to execution. In this case synchronization between all modules is recovered in the global synchronized element following to the local instruction word or words (303) that caused the desynchronization. However, since each TDP (100) keeps a precise control of the timing of all instructions locally, the timing between local instructions in each modules keep running with full time determinism even after the instruction that caused the cross-module desynchronization, that is, all timing arrows are always executed to control the instruction timing locally with full precision. Instructions or local control structures whose execution time cannot be known at compile time are for example a loop command (621) with a variable number of looping cycles determined at runtime, or Wait command of an external event that it time of occurrence is unknown in advanced.

Element or local control structures that maintain synchronism are those that trigger actions and do not consume clock cycle of the TDP (100) or consume an amount of TDP clock cycles that is known by the TDP compiler (512) at compile time before execution.

The TDP compiler (512) ensures synchronized execution of all global synchronized junctions (610, 611, 612, 613), which allows each section between synchronized global elements to be analyzed separately, that is, split the synchronization problem in a sequence smaller synchronization tasks. A synchronization section starts in a synchronized element and finishes on the immediately following synchronized element. Each synchronization sections are analyzed and compiled independently of the previous one and the next one. As an example, in FIGS. 6B, 6C and 6D there are 3 synchronization sections (640, 641, 642), the first starting in element 610 and ending in global synchronized element 611, the second one from element 611 to 612 and the last one from global synchronized element 612 to 613.

If all local element in a synchronization section maintain global synchronism, that is the number of TDP cycles needed for their execution can be determined by the TDP compiler (512) at compile time, then the compiler can determine with precision the execution time of each local instruction with respect to the synchronized node of the start of the section and thus automatically define the time of the last timing arrow of the section (631, 632) to guaranty that the execution of the end-of-section synchronized element in all modules happen at exactly the same time. In the example, synchronized sections 640 and 642 fall into the scenario described above and as a consequence the compiler adjust the end-of-section time, arrows 631 and 632, to make the sum of the arrows in the section for the different flowcharts to add to the same value, in this examples, 20 ns for section 640 and 160 ns for section 642. The sum of the arrows adds to the same in this example because all local instructions words within these two sections runs in a single TDP cycle.

In this scenario the synchronization of modules is achieved by the time counting performed by each TDP (100), there is no need for using triggering resources to implement the synchronization across modules and as a consequence there is no latency or resource cost, the whole synchronization is defined at compile time and during execution is controlled locally by each TDP. Then in this scenario trigger lines are only used in the cases where the synchronized element needs to share some a decision or information across modules but not for synchronization purposes.

If any of the local elements or instructions within a section desynchronize the execution across modules, that is in some of the flowcharts there is one or more elements or instructions whose execution results in a total number of TDP cycles that cannot be determined by the TDP compiler (512) at compile time before the execution, then the compiler cannot accurately determine the time these flowcharts will take to arrive to the end-of-section synchronized element and as a consequence cannot define a value of the end-of-section timing arrow that will align in time the end-of-section synchronized elements of all modules. In this cases the compiler needs to compile an additional procedure to resynchronize the execution in all modules, as an example, in FIG. 6B, 6C, 6D the scenario explained above happens in synchronized section 641, the need for this additional process is indicated by the dotted line and question mark in the timing arrow (630) at the end of section 541. During execution all TPDs will wait the necessary time for all TDPs to reach global synchronized element 612 and execute it at exactly the same time. Each TDP uses one or more trigger signals common to all modules together with its internal time counter (313) to determine the exact clock cycle instant of time when the execution of the global element can be done. In the example of FIG. 6A, only the flowchart of FIG. 6D desynchronize the execution as a consequence of the presence of a While loop (621) for which the number of cycles it will be repeated cannot be determined by the TDP compiler (512) in compile time prior to the execution.

In the scenario described above triggering resources are needed to achieve the synchronization, which has an impact on the execution speed which is limited by the trigger propagation delay The software GUI manages multi-module synchronization transparently to the user while programming is done thus synchronized elements are displayed aligned in all modules and times are adjusted in on-the-fly. This makes the multi-module programming very simple, as programming a single big device, but with all the advantages of modular systems.

In addition, the software allows the user to save the project and then load it with the same graphical software, user libraries or other code editing environment.

User libraries let users load projects already created, modify, compile, load them into the hardware and completely control its execution. Thus, the execution of hardware code can be integrated into any user application software. With the libraries users can start, pause, stop the execution, as well as exchange data and events between the PC and modules. Users can have a collection or library of hardware programs that use the same or different modules and run them at different times during the execution of application software.

In addition, the software allows to download the program for each module group, run and debug the program, inspecting variables, state of TDP (100) and insert local or global breakpoints. Local break points stop the execution of a single module only, while global breakpoints stop all modules in the group.

Global breakpoints are very important in synchronized multi-module real-time systems. The global breakpoints are introduced into one of the modules and replicate at the end of the synchronized section in all other modules of the group. The user can move freely global breakpoints within each section to adjust the exact stopping point for each module.

The illustrations of the representative embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

We claim:

1. A system for distributed time-deterministic synchronized execution for control, test and measurement applications, comprising:
    a set of modules, wherein all modules share at least one trigger signal and a clock signal, and comprise a time-deterministic processor (TDP), the time-deterministic processor being adapted to use the clock signal and at least one trigger signal to run a program distributed across all the modules (M0, . . . , Mn) controlling every time instant of execution of each instruction in the program and, when an assembly comprises more than one module, the TDP synchronizes the execution of all or part of the set of modules; and
    a graphical user interface through which the user enters high level instructions to program each module (M0, . . . , Mn) of the set by using at least one flowchart comprising at least one synchronous element entered by the user in one of the modules and this at least one synchronized element is automatically replicated in other modules of the set to be executed as an instruction word in a same instant of time by the TDP of each module (M0, . . . , Mn) of the set.

2. The distributed execution system according to claim 1, wherein the time-deterministic processor communicates with a common signal bus to all modules (M0, . . . , Mn), the common signal bus comprises a control bus carrying at least one clock signal and at least one trigger signal, shared by all (M0, . . . , Mn) modules.

3. The distributed execution system according to claim 2, wherein the TDP is configured to communicate with the TDPs in other modules through a common communication bus part of the common signal bus.

4. The distributed execution system according to claim 3, wherein the TDP and the modules (M0, . . . , Mn) communicate with an external processor via the communication bus.

5. The distributed execution system according to claim 1, wherein the TDP comprises a core common to all modules, and is configured to read instruction words from a memory or other source, and execute each of the instruction words in a specific instant of time as specified in each of the instruction words, wherein the instruction words are selected from synchronized instructions global to all or part of the modules and local instructions specific to each of the modules, and the TDP core at the same time may pass the instructions to at least one instruction engine to perform additional functions, which are selected from functions common to all modules and functions specific to the each module.

6. The distributed execution system, according to claim 1, wherein the time-deterministic processor executes an instruction word comprising at least one field indicating an exact time of execution of the instruction word.

7. The distributed execution system, according to claim 1, wherein the time-deterministic processor executes an instruction word comprising a control field that enables simultaneous execution of an individual or multiple instructions included in the instruction word.

8. The distributed execution system, according to claim 1, wherein the time-deterministic processor executes synchronized global instructions, for synchronization and synchronized conditional jumps, sharing a decision or information to all or part of the modules (M0, . . . , Mn) which, according to the decision or information, perform an action or a conditional jump with time synchronization.

9. The distributed execution system, according to claim 8, wherein the decision or information shared by the time-deterministic processor between all modules (M0, . . . , Mn) of the assembly, and on which a global conditional jump or action is executed, is synchronized in all modules depends on one, all, or part of the modules (M0, . . . , Mn).

10. The distributed execution system, according to claim 1, wherein the time-deterministic processor executes instructions that generate and wait for at least one trigger or external signals to interact with external events and other modules which do not incorporate a time-deterministic processor.

11. The distributed execution system, according to claim 1, wherein the time-deterministic processor comprises one or more additional execution threads in each module (M0, . . . , Mn) that runs in parallel using a technique of time interlacing instruction by instruction.

12. The distributed execution system, according to claim 1, wherein the time-deterministic processor comprises: a compiler that converts a source code with high-level instructions, which are introduced by a user for all modules (M0, . . . , Mn) as a single programmable device, into a compiled code from which a specific executable code (CM0, . . . CMN) is generated for each module (M0, . . . Mn) with instruction words containing local and synchronized global instructions that are executed by the time-deterministic processor, where the compiled code takes into account the exact time of execution of each and all instruction words in each synchronization section in the source code for synchronization of all global instruction words for all modules (M0, . . . , Mn) in the execution of the executable code (CM0, . . . , CMN) in each specific module (M0, . . . , Mn).

13. The distributed execution system, according to claim 12, wherein the source code with high-level instructions comprises synchronized instructions global to all or a subset of the modules (M0, . . . , Mn) that the compiler compiles into specific execution code (CM0, . . . , CMN) for each of the modules such that the global synchronized instruction is executed in all the modules at the exact same time.

14. The distributed execution system, according to claim 13, wherein the high-level source code further comprises the exact timing between high-level instructions, either local instructions or global synchronized instructions, which the compiler converts into the necessary execution code for the time-deterministic processor in each module (M0, . . . , Mn).

15. The distributed execution system, according to claim 1, wherein the graphical user interface further comprises timing arrows interconnecting an origin element with a destination element in the flowchart which determines the exact instant of execution of the destination element with respect to a source element.

16. The distributed execution system, according to claim 13, wherein the source code with high-level instructions further comprises local elements to each module (M0, . . . , Mn) corresponding to local instruction words, and the execution of a local elements maintain global synchronism with the other modules (M0, . . . , Mn) only if the local instruction word does not consume time, or equivalently clock cycles, of the time-deterministic processor, or they consume an amount of time, or time-deterministic-processor clock cycles, known by the compiler during compile time prior to the execution.

17. The distributed execution system, according to claim 16, wherein the compiler uses timing information known at compile time prior to execution to generate appropriate code for each time-deterministic processor in the module (M0, . . . , Mn) that maintains the synchronization across modules only by means of time counters internal to each time-deterministic processor.

18. The distributed execution system, according to claim 12, wherein the source code with high-level instructions further comprises breakpoints global to all or a subset of the modules (M0, . . . Mn), which correspond to special instruction words in the time-deterministic processor, that stop the execution of the time-deterministic processor at a particular point within a selected synchronized section.

19. The distributed execution system, according to claim 13, wherein the time-deterministic processor comprises time counters that are configured by an execution control tool prior to the execution of the program, and whose configuration is calculated by the compiler based on clocks rates of all the modules (M0, . . . , Mn) and their time-deterministic processors together with a trigger propagation delay across the modules (M0, . . . , Mn).

* * * * *